(12) United States Patent
Ribarich (10) Patent No.: US 6,879,115 B2
(45) Date of Patent: Apr. 12, 2005

(54) ADAPTIVE BALLAST CONTROL IC

(75) Inventor: Thomas J. Ribarich, Laguna Beach, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/616,173

(22) Filed: Jul. 8, 2003

(65) Prior Publication Data

US 2004/0007992 A1 Jan. 15, 2004

Related U.S. Application Data

(60) Provisional application No. 60/395,093, filed on Jul. 9, 2002, and provisional application No. 60/395,473, filed on Jul. 10, 2002.

(51) Int. Cl.[7] .............................................. H05B 37/02
(52) U.S. Cl. ....................... 315/224; 315/291; 315/246; 315/209 R
(58) Field of Search ................................ 315/224, 291, 315/307, 209 R, 246

(56) References Cited

U.S. PATENT DOCUMENTS

| | | | | |
|---|---|---|---|---|
| 6,002,213 A | | 12/1999 | Wood | 315/307 |
| 6,008,593 A | * | 12/1999 | Ribarich | 315/307 |
| 6,259,615 B1 | * | 7/2001 | Lin | 363/98 |
| 6,525,492 B2 | | 2/2003 | Ribarich | 315/291 |

* cited by examiner

Primary Examiner—Tuyet Thi Vo
(74) Attorney, Agent, or Firm—Ostrolenk, Faber, Gerb & Soffen, LLP (57) ABSTRACT

An integrated circuit for controlling a power supply circuit which delivers power to a load circuit that includes a fluorescent lamp, comprising ballast control and drive circuitry that provides drive signals to the power supply circuit, receives sense signals indicating operating conditions of at least one of the power supply circuit and the load circuit, and responds to the sense signals by modifying the drive signals; and including adaptive zero-voltage-switching and minimum-current-switching (ZVMCS) circuitry, wherein the ZVMCS circuitry senses an output of the power supply circuit, and in response thereto, controls the drive circuitry to maintain the power supply circuit under ZVMCS conditions. The power supply circuit includes a half-bridge circuit with low and high side power devices, the drive signals including low side drive signals to control the low side power device and high side drive signals to control the high side power device; the ballast control and drive circuitry including a low side drive output for providing the low side drive signals to the low side power device and a high side drive output for providing the high side drive signals to the high side power device. The ZVMCS circuit senses an output voltage and/or current at the half-bridge circuit between said high side and low side power devices at a switching time of one of the power devices, and controls the drive signals so as to maintain the output voltage and/or current near or at zero at said switching time.

25 Claims, 6 Drawing Sheets

FIG. 7 UVLO CIRCUITRY

FIG. 8 FREQUENCY SWEEP CIRCUITRY

ADAPTIVE BALLAST CONTROL IC

CROSS-REFERENCE TO RELATED APPLICATIONS

The present application is based upon and claims priority of U.S. Provisional Applications Nos. 60/395,093 and 60/395,473 filed respectively on Jul. 9 and 10, 2002 the disclosures of which are incorporated by reference herein.

It is related to U.S. Provisional Application No. 60/482,334 filed on Jun. 24, 2003, also incorporated by reference.

BACKGROUND OF THE INVENTION

Many linear electronic ballasts for fluorescent lighting applications that are sold on the market today include a standard ballast control IC, ASIC or micro-controller. These control ICs perform a variety of functions ranging from power factor correction to lamp/ballast control and have helped meet the technical requirements of new lamp types while reducing component count and cost. In self-ballasted compact fluorescent lamps (CFLs), the self-oscillating bipolar transistor solution is popular due to lower cost, lower component count and smaller size than the equivalent IC+FET-based solution.

This approach is very simple in nature but has the following disadvantages:

Non self-starting (requires a diac and additional circuitry);

Requires additional free-wheeling diodes;

Operating frequency determined by bipolar transistor storage time and toroid saturation;

Unreliable, "always hot" positive-temperature-coefficient (PTC) thermistor used for preheat;

No smooth frequency ramping during ignition;

No protection against lamp non-strike or open filament conditions;

Capacitive-mode operation; and

Base drive limitations at higher powers.

These disadvantages can lead to component and load tolerances and/or catastrophic failure of ballast output stage components, which can result in poor performance, poor quality, and/or field failures.

SUMMARY OF THE INVENTION

To address these problems, the present invention provides an integrated circuit for controlling a power supply circuit which delivers power to a load circuit that includes a fluorescent lamp, comprising ballast control and drive circuitry that provides drive signals to the power supply circuit, receives sense signals indicating operating conditions of at least one of the power supply circuit and the load circuit, and responds to the sense signals by modifying the drive signals; and including adaptive zero-voltage-switching and minimum-current-switching (ZVMCS) circuitry, wherein the ZVMCS circuitry senses an output of the power supply circuit, and in response thereto, controls the drive circuitry to maintain the power supply circuit under ZVMCS conditions.

In an embodiment of the invention, the power supply circuit includes a half-bridge circuit with low and high side power devices, the drive signals including low side drive signals to control the low side power device and high side drive signals to control the high side power device; the ballast control and drive circuitry including a low side drive output for providing the low side drive signals to the low side power device and a high side drive output for providing the high side drive signals to the high side power device. The ZVMCS circuit senses an output voltage and/or current at the half-bridge circuit between said high side and low side power devices at a switching time of one of the power devices, and controls the drive signals so as to maintain the output voltage and/or current near or at zero at said switching time.

The drive circuitry controls the power supply circuit to supply power at an operating frequency; and the ZVMCS circuitry controls the drive circuitry to maintain the operating frequency at or near a resonant frequency of the load circuit, and more preferably, above but near said resonant frequency.

Advantageously, the operating frequency of the drive circuitry is determined by a voltage-controlled oscillator (VCO), and the ZVMCS circuitry determines a control voltage supplied to the VCO. The ZVMCS circuitry may increase the control voltage in order to increase the operating frequency. Preferably the control voltage is supplied by an input capacitor of the VCO, and the ZVMCS circuitry charges the capacitor to a higher voltage in order to increase the operating frequency. The ZVMCS circuitry may charge the capacitor by turning on a switching device in order to supply a charging current to the capacitor.

The integrated circuit preferably has a set of modes in any of which it can operate, the ballast control and drive circuitry making transitions between the modes in response to the sense signals; and including adaptive zero-voltage-switching and minimum-current-switching (ZVMCS) circuitry, wherein the ZVMCS circuitry senses an output of the power supply circuit and in response thereto, controls the drive circuitry to maintain the power supply circuit under ZVMCS conditions. Advantageously the modes include an under-voltage lockout mode, a frequency sweep mode, an adaptive mode and a fault mode.

According to another aspect of the invention, the integrated circuit has eight pins; four pins being connected to the drive circuitry; two pins being connected to a power supply and a return; and two pins being used for setting an operating frequency of the drive circuitry. When the operating frequency is determined by a voltage-controlled oscillator (VCO), a control voltage may be supplied to the VCO by an input capacitor connected to one of said two pins for setting an operating frequency; and the other one of said two pins may be used to set a minimum frequency of the VCO. The ZVMCS circuitry may set the control voltage by controlling a charge on the input capacitor of the VCO.

According to a further aspect of the invention, a method for controlling a power supply circuit which delivers power to a load circuit that includes a fluorescent lamp, comprises the steps of providing drive signals to the power supply circuit, receiving sense signals indicating operating conditions of at least one of the power supply circuit and the load circuit, responding to the sense signals by modifying the drive signals; and adaptively maintaining zero-voltage-switching and minimum-current-switching (ZVMCS), by sensing an out put of the power supply circuit and in response thereto, controlling the drive signals to maintain the power supply circuit under ZVMCS conditions.

Advantageously the power supply circuit includes a half-bridge circuit with low and high side power devices, the drive signals including low side drive signals to control the low side power device and high side drive signals to control the high side power device; and the ZVMCS conditions are maintained by sensing an output voltage and/or current of the half-bridge circuit between the high side and low side power devices at a switching time of one of the power devices, and controlling the drive signals so as to maintain the output voltage and/or current near or at zero at said switching time. Advantageously the power supply circuit supplies power at an operating frequency; and The operating frequency is maintained at or near a resonant frequency of said load; and more preferably above but near the resonant frequency.

In an embodiment of the invention, the operating frequency is determined by a voltage-controlled oscillator (VCO), and the invention comprises the step of controlling a control voltage supplied to the VCO. The control voltage is preferably supplied by an input capacitor of the VCO, and the invention comprises the step of controlling a charge on the input capacitor in order to set the operating frequency.

According to an embodiment of the invention, a ballast controller and 600V Half-bridge Drivers are integrated into one chip for a compact fluorescent lamp application. The IC includes adaptive zero-voltage minimum-current switching (ZVMCS), as well as an integrated bootstrap diode. A part of this IC is a voltage-controlled oscillator with externally programmable minimum frequency. All of the ballast features are integrated in a small 8 pin DIP or SOIC package.

Some features of this embodiment are:

600V Half Bridge Driver

Adaptive zero-voltage minimum-current switching (ZVMCS)

Integrated Bootstrap Diode 0 to 5 VDC Voltage Controlled Oscillator (Analog input)

Micropower Startup (150 µA)

15.6V zener clamp on Vcc

Programmable minimum frequency

Small DIP8/SO8 Package

The disclosed 8-pin adaptive ZVS and MCS ballast control IC is especially well adapted for CFL applications. Novel control and sensing techniques have been developed to realize important ballast functions without compromising IC pin count. The resulting system solution has better performance than the comparative self-oscillating solution, uses fewer components and is competitive on cost. This IC solution offers higher immunity against system tolerances and variations and can be scaled up or down easily for lower or higher power levels. Finally, the simplicity of this new IC meets the needs of the marketplace.

Other features and advantages of the present invention will become apparent from the following description of an embodiment of the invention which refers to the accompanying drawings.

DETAILED DESCRIPTION OF AN EMBODIMENT OF THE INVENTION

Figure 1:
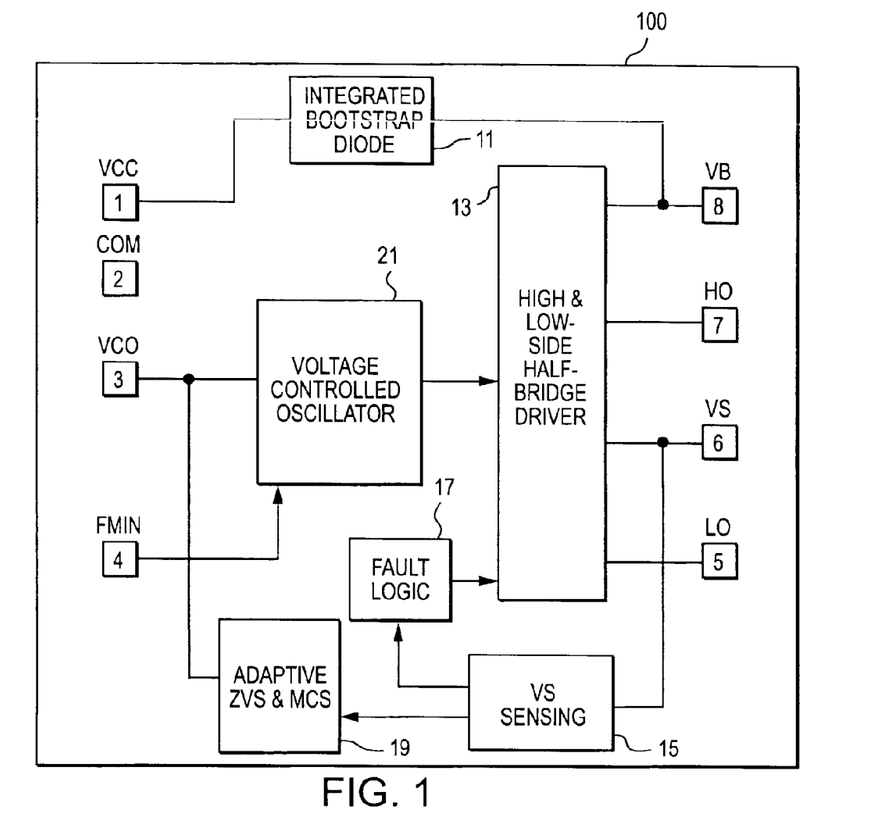
FIG. 1 is a block diagram showing the circuitry of the IC.

A simple, low-cost IC solution has been developed that integrates multiple CFL functions, plus the high- and low-side half-bridge driver (FIG. 1). In order to minimize packaging costs, the IC has been limited to 8 pins so that it fits into a standard SO8 or DIP8 package. The half-bridge driver requires four pins 8, 7, 6 and 5 (VB, HO, VS and LO), the power supply and return require two pins 1 and 2 (VCC and COM), and one pin 4 is used to program the minimum frequency (FMIN).

This results in only one control pin 3 available for the ballast functions. To achieve this, a voltage-controlled oscillator analog input pin (VCO) is used together with an internal adaptive control system and method, and a half-bridge voltage sensing technique to realize all of the preheat, ignition, running and fault protection functions.

Figure 2:
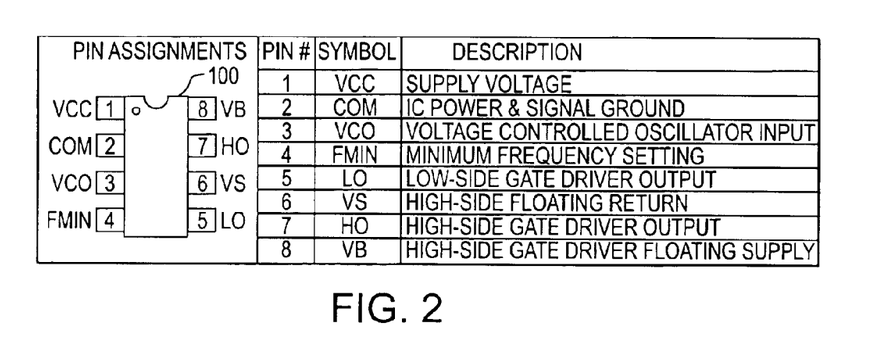
FIG. 2 is a table showing pin assignments in the IC.

FIG. 1 shows a block diagram of the IC, and FIG. 2 is a table of pin assignments of the IC. Referring to FIGS. 1 and 2, the IC 100 has an integrated bootstrap diode 11 connected between the VCC input pin 1 and the VB supply pin 8. A known high- and low-side half-bridge driver circuit 13 has the conventional VB, HO, VS and LO pins 8, 7, 6 and 5. The high-side floating return voltage VS is sensed by a circuit 15, which provides its output to a fault logic circuit 17 and an adaptive ZVS/MCS control circuit 19. The output of the ZVS/MCS circuit 19 is provided to a VCO 21, which receives a further input from the FMIN pin 4. Examples of recommended operating conditions, absolute maximum ratings, and electrical characteristics in this embodiment are set forth in Tables 1, 2 and 3 attached hereto.

Under-voltage Lock-Out Mode

Referring now to the state diagram presented in FIG. 10, the under-voltage lockout mode (UVLO) S2 is defined as the state of the IC 100 when VCC is below the turn-on threshold of the IC. The under-voltage lock-out is designed to maintain an ultra-low supply current (<200 µA), and to guarantee that the IC is fully functional before the high and low side output driver 13 is activated.

Figure 3:
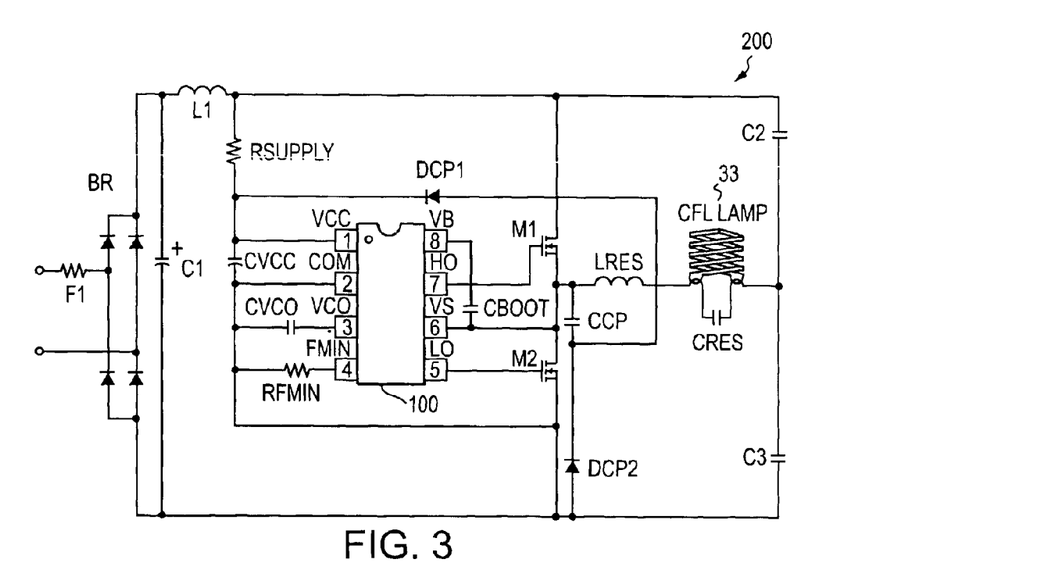
FIG. 3 is a schematic diagram showing an application of the IC in a CFL circuit.
Figure 7:
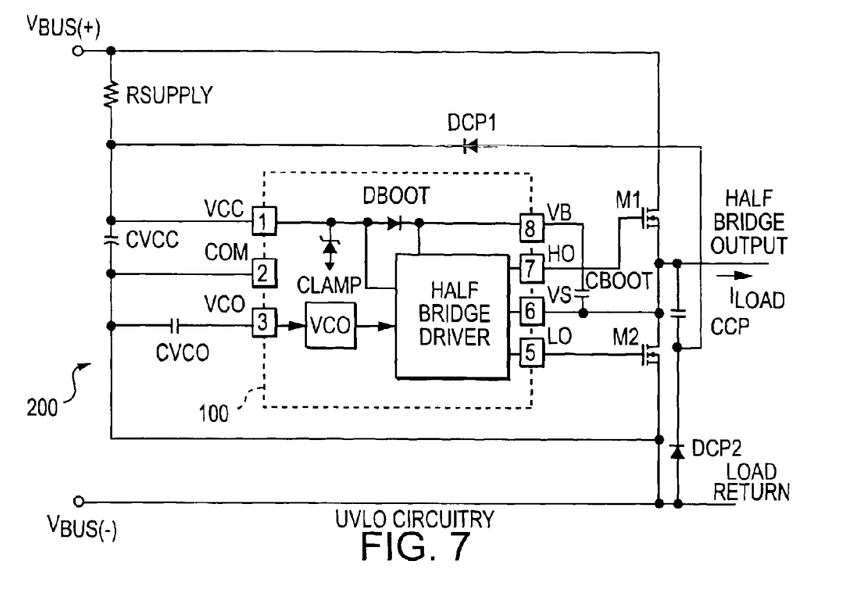
FIG. 7 is a schematic diagram of circuit elements in the under-voltage lock-out (UVLO) mode.

FIG. 3 shows an application of the IC 100 in a compact fluorescent lamp (CFL) circuit 200, and FIG. 7 shows the components that carry out the UVLO mode. The start-up capacitor, CVCC, is charged by current through the supply resistor, $R_{supply}$, minus the start-up current-drawn by the IC 100. This resistor is chosen to provide sufficient current to supply the IC 100 from the DC bus. CVCC should be large enough to hold the voltage at VCC above the UVLO threshold for one half cycle of the line voltage as it will only be charged at the peak. Once the capacitor voltage on VCC reaches the start-up threshold, the IC 100 turns on and HO and LO starts oscillating.

An internal bootstrap diode 11 between VCC and VB and an external supply capacitor, CBOOT, determine the supply voltage VB for the high side driver circuitry. A charge pump circuit using a capacitor, CCP, and two diodes, DCP1 and DCP2, supplies the voltage for the low side driver circuitry.

To guarantee that the high-side supply is charged up before the first pulse on pin HO, the first pulse from the output drivers comes from the LO pin.

During UVLO mode, the high and low side driver outputs, HO and LO, are both low and in VCO is pulled up to 5V for resetting the starting frequency to the maximum.

Frequency Sweep Mode

Figure 8:
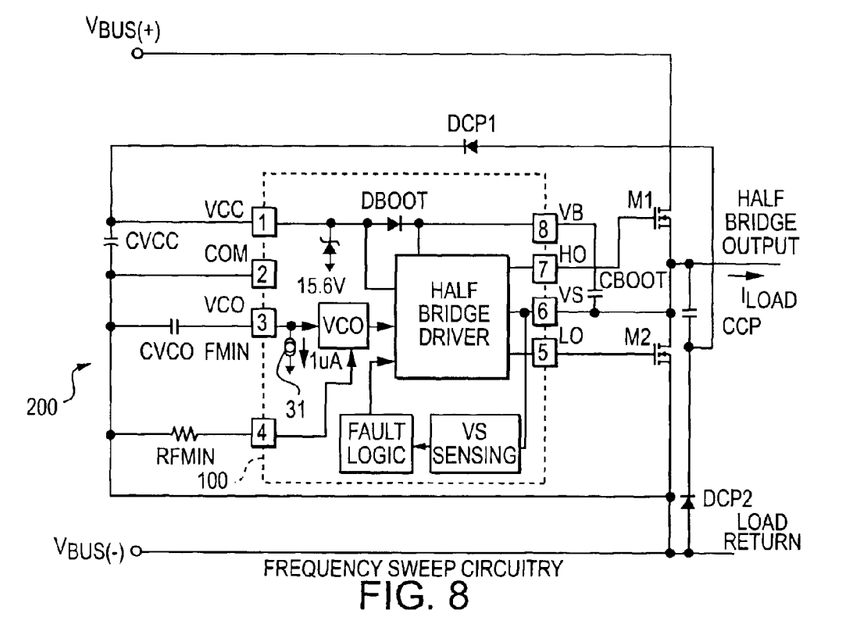
FIG. 8 is a schematic diagram of circuit elements in the frequency sweep mode.

When VCC exceeds the VLO positive threshold (step S3 in FIG. 10), the IC 100 starts the frequency sweep mode. An internal current source 31 discharges the external capacitor CVCO on pin VCO, and the voltage on the VCO 21 starts ramping down exponentially. This decreases the frequency of the VCO 21 which ramps down towards the resonance frequency of the high-Q ballast output stage, causing the lamp voltage and load current to increase. The frequency keeps decreasing until the lamp 33 ignites or the current limit of the IC 100 is reached. If the current exceeds the limit, IC 100 enters the fault mode (discussed below). The internal current sensing threshold, VCSTH, determines the allowable peak ignition current of the ballast output stage. On the other hand, if the lamp ignites successfully, the voltage on VCO 21 continues to decrease until it reaches 0.5V and the IC enters the adaptive mode (also discussed below) for maintaining zero-voltage minimum-current switching (ZVMCS).

Preheat and Ignition

Figure 4:
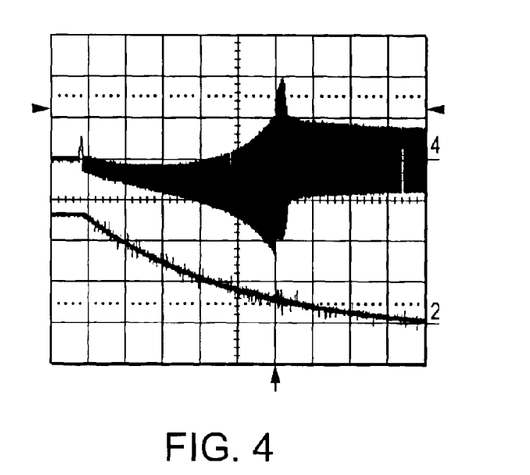
FIG. 4 is a graph showing lamp voltage (upper trace, 250V/div) and VCO pin voltage (2 V/div) during preheat, ignition and running (time scale=200 ms/div)

During preheat and ignition, the VCO pin 3 starts at 5V (which sets output frequency at the maximum) and then ramps down exponentially to 0V to the minimum frequency (FIG. 4). This is achieved by an external capacitor (CVCO) being discharged by an internal non-linear current source 31. As the frequency ramps down towards the high-Q resonance frequency of the output stage, the filaments of the lamp 33 are preheated until the lamp voltage increases high enough and the lamp ignites. The minimum frequency is programmed by an external resistor RFMIN at the FMIN pin 4, and should be set below the resonance frequency of the high-Q output circuit to ensure that the frequency ramps through resonance for lamp ignition. The maximum frequency is then set internally to a fixed margin higher than the minimum frequency to ensure that at initial start-up the lamp voltage is low and no undesired 'flash' occurs across the lamp. The amount of preheating and time-to-light is programmed by the external capacitor CVCO and resistor at the VCO pin 3. The exponential shape of the ramp causes the VCO 21 to ramp quickly through the higher frequencies where the gain across the resonant output stage is low and there is less current available for preheating, and then slower through the lower frequencies as the output stage approaches resonance where the gain is higher and there are higher currents available for preheating.

Adaptive ZVMCS Control

The ZVMCS circuitry (FIG. 9) is enabled when the voltage on VCO 21 decreases to 0.5V or below, allowing the frequency to sweep through resonance and the lamp 33 to ignite. When the lamp ignites, the output stage becomes a low-Q RCL circuit and the frequency is decreased until the operating point is slightly above resonance.

Figure 10:
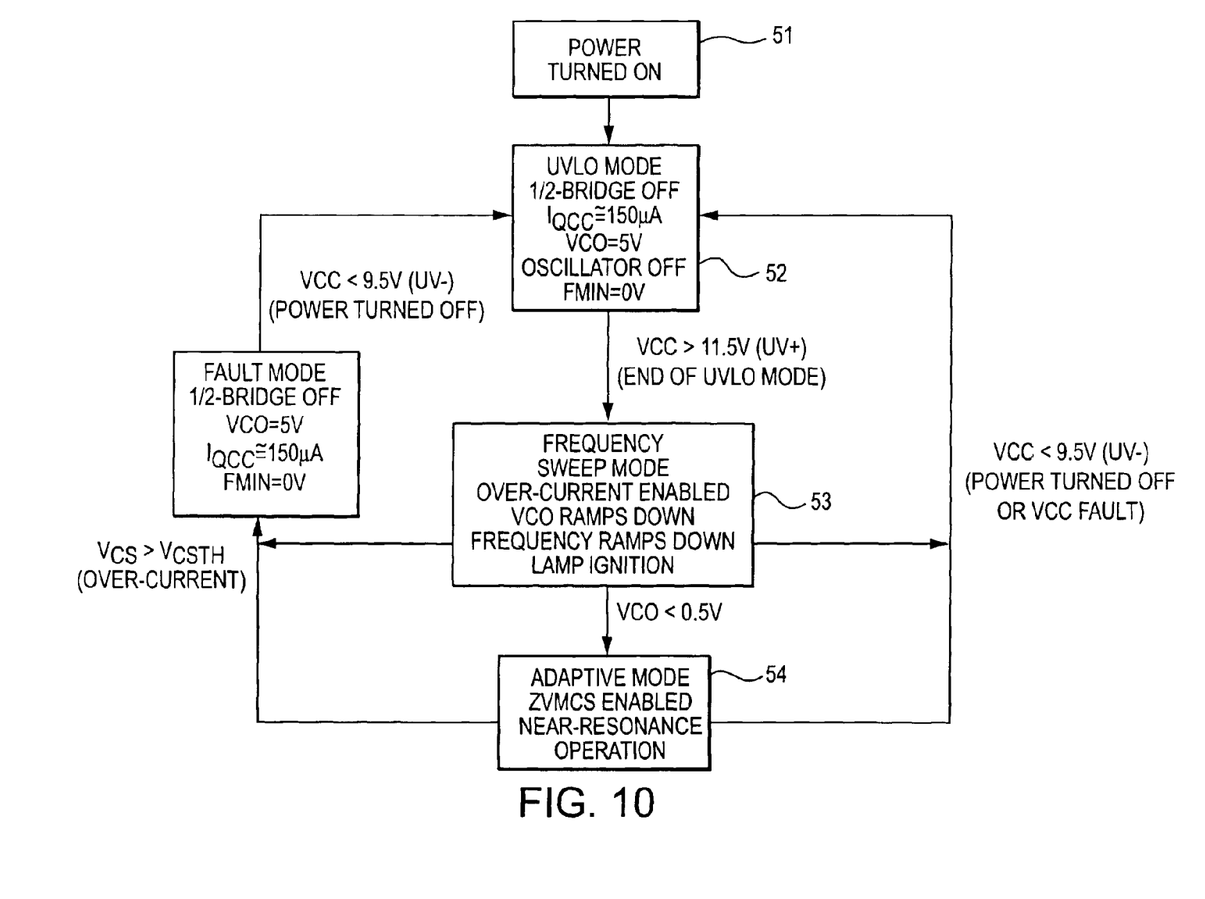
FIG. 10 is a state diagram illustrating steps in the operation of the IC.

During running, it is desirable to set the operating frequency as close as possible to the resonance frequency of the overdamped RCL output stage while maintaining zero-voltage switching (ZVS) at the half-bridge M1, M2 (step S4 in FIG. 10). This is because the output current will be almost in-phase with the half-bridge output voltage resulting in minimum-current switching (MCS) as well. Operating in this mode will minimize the switching losses of the half-bridge MOSFETs M1, M2. Closed-loop control of this operating point will also maintain ZVS and MCS over component and lamp tolerances during production, line voltage variations and lamp variations with time.

Figure 9:
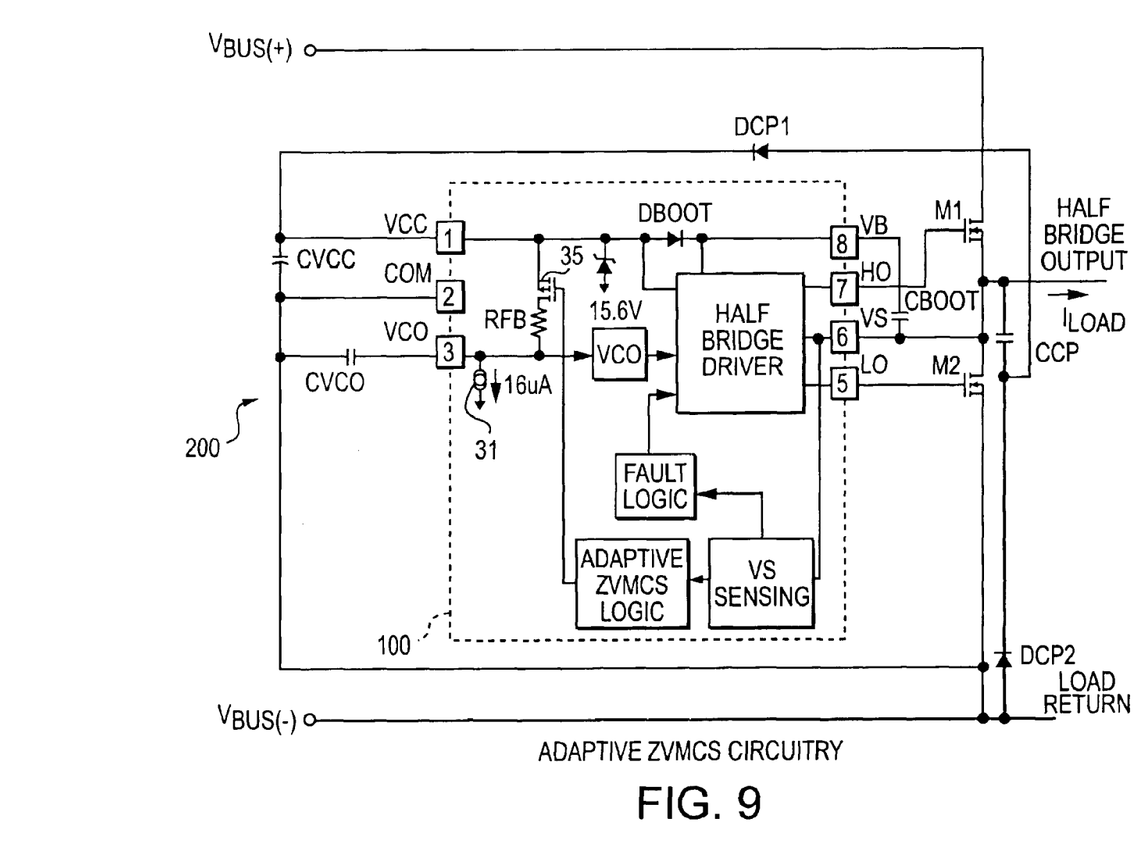
FIG. 9 is a schematic diagram of circuit elements in the adaptive ZVMCS mode.

This adaptive ZVS and MCS control is achieved by internally sensing the half-bridge output voltage at the VS pin 6 during the non-overlapping deadtime of the half-bridge switches M1, M2. During each switching cycle of the half-bridge, the half-bridge voltage slews to the opposite rail during the deadtime. If the voltage has not slewed entirely to the opposite rail such that there is zero voltage across the appropriate switch before turn-on, then the operating frequency is too far from resonance and the frequency is shifted up.

This measurement is performed at the turn-on of the low-side MOSFET M2, minus a small delay (100 ns) for early detection and safe margin. If the voltage has not slewed to zero by this time, then a pulse of current is delivered by an internal MOSFET 35 to the VCO pin 3, which causes the external capacitor CVCO to charge up slightly, and therefore the frequency to increase slightly. The VCO capacitor CVCO then discharges slowly to COM during the rest of the cycle due to the internal current source 31. The frequency is thereby urged to decrease towards resonance due to a parallel resistor discharging the VCO capacitor CVCO and the adaptive ZVS circuit 19 (FIG. 9) urges the frequency back up slightly above resonance when non-ZVS occurs.

Figure 5:
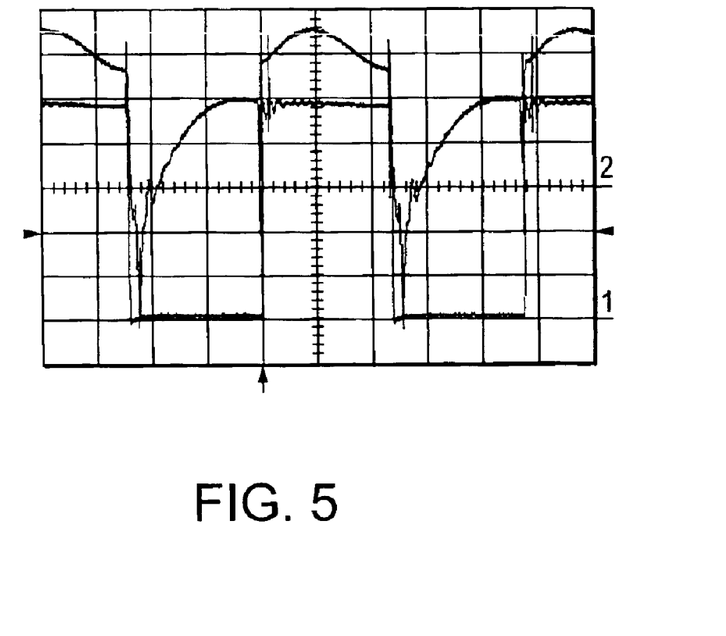
FIG. 5 is a graph showing half-bridge voltage VS (lower trace, 50V/div) and low-side MOSFET current (middle) during adaptive running at 120 VAC (time scale=5 us/div, frequency=41.7 kHz)
Figure 6:
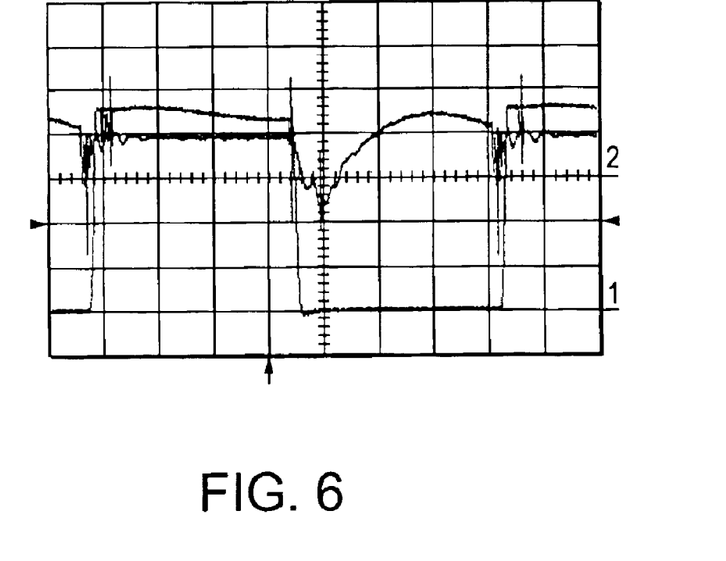
FIG. 6 is a graph showing half-bridge voltage VS (lower trace, 50V/div) and low-side MOSFET current (middle) during adaptive running at 90 VAC (time scale=2 us/div, frequency=66.5 kHz)

The circuit then remains in this closed-loop adaptive near-resonance mode during running and guarantees ZVS and MCS operation with changing line conditions, component tolerances variations and lamp/load variations (FIGS. 5 and 6).

In particular, if line voltage decreases, the over-damped resonance frequency is increased and the operating frequency is therefore increased by the circuit to maintain ZVS and MCS.

The 600V fabrication process used in the development of this IC allows for the VS pin 6 to be measured with an internal high-voltage MOSFET during the non-overlapping deadtime, while withstanding the high DC bus voltage during other portions of the switching cycle when the high-side MOSFET M1 is turned on and VS is at the DC bus potential.

Fault Protection

The fault mold (step S5 in FIG. 10) will now be described. Should a lamp non-strike condition occur where the filaments are intact but the lamp does not ignite, the lamp voltage and output stage current will increase during the ignition ramp until. excessive currents occur or the resonant inductor LRES saturates. In order to detect this, the IC performs an additional measurement of the VS pin 6 during the entire on-time of the low-side MOSFET M2. This voltage at the VS pin during the on-time of LO is given by the low-side MOSFET current, and therefore the output stage current, flowing through the on-resistance (RDSon) of the lowside MOSFET M2. Sensing the half-bridge current in this way eliminates the need for an external current-sensing resistor and additional current-sensing pin on the IC. The RDSon of-the low-side MOSFET M2 serves as the current sensing resistor and the VS pin 6 serves as the current sensing pin on the IC 100. An internal high-voltage MOSFET is turned on when VS is low (the low-side MOSFET M2 is 'on') to let the voltage measure through to the low-side circuitry for performing the current sensing, and is turned off during the rest of the switching cycle for withstanding the high-voltage when VS is equal to the DC bus voltage (high-side MOSFET M1 is 'on'). Since the RDSon has a positive temperature coefficient, the internal over-current threshold is set to a higher value (about 5V) such that only excessive dangerous currents or inductor saturation will exceed the threshold and normal ignition Will not. Should the voltage at the VS pin exceed the internal 5V threshold during the on-time of LO, the IC will enter Fault Mode and both gate driver outputs 5, 7 will be latched 'low'. To reset the IC back to preheat mode, VCC is recycled below and above the internal UVLO thresholds.

Should an open filament lamp fault occur, the adaptive ZVS/MCS circuit 19 will shift the frequency to the maximum in an attempt to maintain ZVS and MCS. If the frequency reaches the maximum, exceeding 5V as measured by the VCO pin 3, the circuit will enter Fault Mode and both gate driver outputs 5, 7 will be latched 'low'. To reset the IC back to preheat mode, VCC is recycled below and above the internal UVLO thresholds.

Although the present invention has been described in relation to particular embodiments thereof, many other variations and modifications and other uses will become apparent to those skilled in the art. Therefore, the present invention is not limited by the specific disclosure herein.

TABLE 1

Recommended Operating Conditions
For proper operation the device should be used within the recommended conditions.

| Symbol | Definition | Min. | Max. | Units |
| --- | --- | --- | --- | --- |
| $V_{BS}$ | High Side Floating Supply Voltage | $V_{CC} - 0.7$ | $V_{CLAMP}$ | V |
| $V_S$ | Steady State High-side Floating Supply Offset Voltage | $-1$ | 600 | |
| $V_{CC}$ | Supply Voltage | $V_{CCUV+}$ | $V_{CLAMP}$ | |
| $I_{CC}$ | Supply Current | Note 2 | 10 | mA |
| $R_{FMIN}$ | Minimum frequency setting resistance | 10 | 100 | kΩ |
| $V_{VCO}$ | VCO pin voltage | 0 | 5 | V |
| $T_J$ | Junction Temperature | $-25$ | 125 | ° C. |

Note 2:
Enough current should be supplied into the VCC pin to keep the internal 15.6 V zener clamp diode on this pin regulating its voltage, $V_{CLAMP}$.

TABLE 2

Absolute Maximum Ratings
Absolute Maximum Ratings indicate sustained limits beyond which damage to the device may occur. All voltage parameters are absolute voltages referenced to COM, all currents are defined positive into any lead. The Thermal Resistance and Power Dissipation ratings are measured under board mounted and still air conditions

| Symbol | Definition | | Min. | Max. | Units |
| --- | --- | --- | --- | --- | --- |
| $V_B$ | High-Side Floating Supply Voltage | | $-0.3$ | 625 | V |
| $V_S$ | High-Side Floating Supply Offset Voltage | | $V_B - 25$ | $V_B + 0.3$ | |
| $V_{HO}$ | High-Side Floating Output Voltage | | $V_S - 0.3$ | $V_B + 0.3$ | |
| $V_{LO}$ | Low-Side Output Voltage | | $-0.3$ | $V_{CC} + 0.3$ | |
| $I_{OMAX}$ | Maximum allowable output current (HO, LO) due to external power transistor miller effect | | $-500$ | 500 | mA |
| $V_{VCO}$ | Voltage controlled oscillator input voltage | | $-0.3$ | $V_{CC} + 0.3$ | V |
| $I_{CC}$ | Supply Current (Note 1) | | $-20$ | 20 | mA |
| dV/dT | Allowable Offset Voltage Slew Rate | | $-50$ | 50 | V/ns |
| $P_D$ | Package Power Dissipation @ TA ≦ +25° C. | (8-Pin DIP) | — | 1 | W |
| | $P_D = (T_{JMAX} - T_A)/R_{\theta JA}$ | (8-Pin SOIC) | — | 0.625 | |
| $R_{\theta JA}$ | Thermal Resistance, Junction to Ambient | (8-Pin DIP) | — | 125 | ° C./W |
| | | (8-Pin SOIC) | — | 200 | |
| $T_J$ | Junction Temperature | | $-55$ | 150 | ° C. |
| $T_S$ | Storage Temperature | | $-55$ | 150 | |
| $T_L$ | Lead Temperature (soldering 10 seconds) | | — | 300 | |

Note 1:
This IC contains a zener clamp structure between the chip VCC and COM, which has a nominal breakdown voltage of 15.6 V. Please note that this supply pin should not be driven by a DC, low impedance power source greater than the VCLAMP specified in the Electrical Characteristics section.

TABLE 3

Electrical Characteristics

| Symbol | Definition | Min | Typ | Max | Units | Test Conditions |
| --- | --- | --- | --- | --- | --- | --- |
| Supply Characteristics | | | | | | |
| $V_{CCUV+}$ | $V_{CC}$ Supply Undervoltage Positive Going Threshold | 10.5 | 11.5 | 12.5 | V | $V_{CC}$ rising from 0 V |
| $V_{CCUV-}$ | $V_{CC}$ Supply Undervoltage Negative Going Threshold | 8.5 | 9.5 | 10.5 | | $V_{CC}$ falling from 14 V |
| $V_{UVHYS}$ | $V_{CC}$ Supply Undervoltage Lockout Hysteresis | 1.5 | 2.0 | 3.0 | | |

TABLE 3-continued

Electrical Characteristics

| Symbol | Definition | Min | Typ | Max | Units | Test Conditions |
|---|---|---|---|---|---|---|
| $I_{QCCUV}$ | UVLO Mode Quiescent Current | 50 | 120 | 200 | µA | $V_{CC}$ = 11 V |
| $I_{QCCFLT}$ | Fault-Mode Quiescent Current | — | 180 | — | | |
| $I_{QCC}$ | Quiescent $V_{CC}$ Supply Current | — | 1.8 | — | mA | $V_{CC}$ = 14 V |
| $I_{CC50k}$ | $V_{CC}$ Supply Current, f = 50 kHz | — | 1.8 | — | | |
| $V_{CLAMP}$ | $V_{CC}$ Zener Clamp Voltage | 14.5 | 15.6 | 16.5 | V | $I_{CC}$ = 10 mA |
| Floating Supply Characteristics | | | | | | |
| $I_{QBS0}$ | Quiescent $V_{BS}$ Supply Current | −1 | 0 | 5 | µA | $V_{HO} = V_S$ |
| $I_{QBS1}$ | Quiescent $V_{BS}$ Supply Current | — | 28 | — | | $V_{LO} = V_B$ |
| $V_{BSMIN}$ | Minimum Required $V_{BS}$ Voltage for Proper HO Functionality | — | 2.5 | — | V | |
| $I_{LK}$ | Offset Supply Leakage Current | — | — | 50 | µA | $V_B = V_S$ = 600 V |
| Oscillator I/O Characteristics | | | | | | |
| $F_{VCO(min)}$ | Minimum Oscillator Frequency | — | 30 | — | kHz | VCO = 0 V, RFMIN = 39 K |
| $F_{VCO(max)}$ | Maximum Oscillator Frequency | — | 110 | — | | VCO = 5 V, RFMIN = 39 K |
| D | Oscillator Duty Cycle | — | 50 | — | % | |
| $T_{DLO}$ | LO Output Deadtime | — | 1.2 | — | µS | RFMIN = 39 K |
| $T_{DHO}$ | HO Output Deadtime | — | 1.2 | — | | RFMIN = 39 K |
| $I_{VCOPH}$ | Preheat mode & Frequency sweep mode VCO pin discharge current | — | 1.0 | — | µA | CVO < VCC |
| $I_{VCOADPT}$ | Adaptive mode VCO pin discharge current | — | 16.0 | — | | |
| $V_{VCOFLT}$ | Fault mode & UVLO mode VCO pin voltage | — | 5 | — | V | |
| Gate DriverOutput Characteristics | | | | | | |
| $V_{OL}$ | Low level output voltage (HO or LO) | — | — | 100 | mV | |
| $V_{HL}$ | High level output voltage (HO or LO) | — | — | 100 | | |
| $T_{RISE}$ | Turn on rise time | — | — | 150 | NS | |
| $T_{FALL}$ | Turn off fall time | — | — | 100 | | |
| Protection Characteristics | | | | | | |
| $V_{CSTH}$ | Peak over current latch threshold voltage | — | 5 | — | V | |
| Minimum Frequency setting Characteristics | | | | | | |
| $V_{FMIN}$ | FMIN pin voltage during normal operation | — | 5.0 | — | V | |
| $V_{FMINFLT}$ | FMIN pin voltage during fault mode | — | 0.0 | — | V | $V_{CS} < V_{CSTH}$ |

$V_{CC} = V_{BS} = V_{BIAS}$ = 14 V +/− 0.25 V,
$C_{LO} = C_{HO}$ = 1000 pF.
$T_A$ = 25 C. unless otherwise specified.

What is claimed is:

1. An integrated circuit for controlling a power supply circuit which delivers power to a load circuit that includes a fluorescent lamp, comprising:
    ballast control and drive circuitry that provides drive signals to the power supply circuit, that receives sense signals indicating operating conditions of at least one of the power supply circuit and the load circuit, and that responds to the sense signals by modifying the drive signals; and including
    adaptive zero-voltage-switching and minimum-current-switching (ZVMCS) circuitry, wherein said ZVMCS circuitry senses an output of said power supply circuit and in response thereto, controls said drive circuitry to maintain said power supply circuit under ZVMCS conditions;
    wherein the power supply circuit includes a half-bridge circuit with low and high side power devices, the drive signals including low side drive signals to control the low side power device and high side drive signals to control the high side power device; the ballast control and drive circuitry including a low side drive output for providing the low side drive signals to the low side power device and a high side drive output for providing the high side drive signals to the high side power device; and
    wherein said ZVMCS circuit senses an output voltage of said half-bridge circuit between said high side and low side power devices at a switching time of one of said power devices, and controls said drive signals so as to maintain said output voltage near or at zero at said switching time.

2. An integrated circuit for controlling a power supply circuit which delivers power to a load circuit that includes a fluorescent lamp, comprising:
    ballast control and drive circuitry that provides drive signals to the power supply circuit, that receives sense signals indicating operating conditions of at least one of the power supply circuit and the load circuit, and that responds to the sense signals by modifying the drive signals; and including
    adaptive zero-voltage-switching and minimum-current-switching (ZVMCS) circuitry, wherein said ZVMCS circuitry senses an output of said power supply circuit and in response thereto, controls said drive circuitry to maintain said power supply circuit under ZVMCS conditions;
    wherein the power supply circuit includes a half-bridge circuit with low and high side power devices, the drive signals including low side drive signals to control the low side power device and high side drive signals to control the high side power device; the ballast control and drive circuitry including a low side drive output for providing the low side drive signals to the low side power device and a high side drive output for providing the high side drive signals to the high side power device; and
    wherein said ZVMCS circuit senses an output current of said half-bridge circuit between said high side and low side power devices at a switching time of one of said power devices, and controls said drive signals so as to maintain said output current near or at zero at said switching time.

3. An integrated circuit for controlling a power supply which delivers power to a load circuit that includes a fluorescent lamp, comprising:

ballast control and drive circuitry that provides drive signals to the power supply circuit, that receives sense signals indicating operating conditions of at least one of the power supply circuit and the load circuit, and that responds to the sense signals by modifying the drive signals;

the ballast control and drive circuitry further having a set of modes in any of which it can operate, the ballast control and drive circuitry making transitions between the modes in response to the sense signals; and including adaptive zero-voltage-switching and minimum-current-switching (ZVMCS) circuitry, wherein said ZVMCS circuitry senses an output of said power supply circuit and in response thereto, controls said drive circuitry to maintain said power supply circuit under ZVMCS conditions;

in which the modes include an under-voltage lockout mode, a frequency sweep mode, an adaptive mode and a fault mode.

4. A method for controlling a power supply circuit which delivers power to a load circuit that includes a fluorescent lamp, comprising the steps of:

providing drive signals to the power supply circuit, receiving sense signals indicating operating conditions of at least one of the power supply circuit and the load circuit, responding to the sense signals by modifying the drive signals; and adaptively maintaining zero-voltage-switching and minimum-current-switching (ZVMCS), by sensing an output of said power supply circuit and in response thereto, controlling said drive signals to maintain said power supply circuit under ZVMCS conditions;

wherein the power supply circuit includes a half-bridge circuit with low and high side power devices, the drive signals including low side drive signals to control the low side power device and high side drive signals to control the high side power device; and wherein said ZVMCS conditions are maintained by sensing an output voltage of said half-bridge circuit between said high side and low side power devices at a switching time of one of said power devices, and controlling said drive signals so as to maintain said output voltage near or at zero at said switching time.

5. A method for controlling a vower supply circuit which delivers power to a load circuit that includes a fluorescent lamp, comprising the steps of:

providing drive signals to the power supply circuit, receiving sense signals indicating operating conditions of at least one of the power supply circuit and the load circuit, responding to the sense signals by modifying the drive signals; and adaptively maintaining zero-voltage-switching and minimum-current-switching (ZVMCS), by sensing an output of said power supply circuit and in response thereto, controlling said drive signals to maintain said power supply circuit under ZVMCS conditions;

wherein the power supply circuit includes a half-bridge circuit with low and high side power devices, the drive signals including low side drive signals to control the low side power device and high side drive signals to control the high side power device; and wherein said ZVMCS conditions are maintained by sensing an output current of said half-bridge circuit between said high side and low side power devices at a switching time of one of said power devices, and controlling said drive signals so as to maintain said output current near or at zero at said switching time.

6. An integrated circuit for controlling a power supply circuit which delivers power to a load circuit that includes a fluorescent lamp, comprising:

ballast control and drive circuitry that provides drive signals to the power supply circuit, that receives sense signals indicating operating conditions of at least one of the power supply circuit and the load circuit, and that responds to the sense signals by modifying the drive signals; and including adaptive zero-voltage-switching and minimum-current-switching (ZVMCS) circuitry, wherein said ZVMCS circuitry senses an output of said power supply circuit and in response thereto, controls said drive circuitry to maintain said power supply circuit under ZVMCS conditions;

wherein said load circuit has a resonant frequency;

said drive circuitry controls said power supply circuit to supply power at an operating frequency; and said ZVMCS circuitry controls said drive circuitry to maintain said operating frequency at or near said resonant frequency.

7. The integrated circuit of claim 6, wherein said operating frequency is maintained above but near said resonant frequency.

8. The integrated circuit of claim 6, wherein the power supply circuit includes a half-bridge circuit with low and high side power devices, the drive signals including low side drive signals to control the low side power device and high side drive signals to control the high side power device; the ballast control and drive circuitry including a low side drive output for providing the low side drive signals to the low side power device and a high side drive output for providing the high side drive signals to the high side power device; and said ZVMCS circuit senses an output current of said half-bridge circuit between said high side and low side power devices at a switching time of one of said power devices, and controls said drive signals so as to maintain said output current near or at zero at said switching time.

9. The integrated circuit of claim 6, wherein the power supply circuit includes a half-bridge circuit with low and high side power devices, the drive signals including low side drive signals to control the low side power device and high side drive signals to control the high side power device; the ballast control and drive circuitry including a low side drive output for providing the low side drive signals to the low side power device and a high side drive output for providing the high side drive signals to the high side power device; and said ZVMCS circuit senses an output voltage of said half-bridge circuit between said high side and low side power devices at a switching time of one of said power devices, and controls said drive signals so as to maintain said output voltage near or at zero at said switching time.

10. The integrated circuit of claim 9, wherein said ZVMCS circuit senses an output current of said half-bridge circuit between said high side and low side power devices at a switching time of one of said power devices, and controls said drive signals so as to maintain said output current near or at zero at said switching time.

11. The integrated circuit of claim 6, wherein said operating frequency of said drive circuitry is determined by a voltage-controlled oscillator (VCO), and said ZVMCS circuitry determines a control voltage supplied to said VCO.

12. The integrated circuit of claim 11, wherein said ZVMCS circuitry increases said control voltage in order to increase said operating frequency.

13. The integrated circuit of claim 12, wherein said control voltage is supplied by an input capacitor of said VCO, and said ZVMCS circuitry charges said capacitor to a higher voltage in order to increase said operating frequency.

14. The integrated circuit of claim 13, wherein said ZVMCS circuitry charges said capacitor by turning on a switching device in order to supply a charging current to said capacitor.

15. An integrated circuit for controlling a power supply which delivers power to a load circuit that includes a fluorescent lamp, comprising:

ballast control and drive circuitry that provides drive signals to the power supply circuit, that receives sense signals indicating operating conditions of at least one of the power supply circuit and the load circuit, and that responds to the sense signals by modifying the drive signals;

the ballast control and drive circuitry further having a set of modes in any of which it can operate, the ballast control and drive circuitry making transitions between the modes in response to the sense signals; and including adaptive zero-voltage-switching and minimum-current-switching (ZVMCS) circuitry, wherein said ZVMCS circuitry senses an output of said power supply circuit and in response thereto, controls said drive circuitry to maintain said power supply circuit under ZVMCS conditions;

wherein said integrated circuit has eight pins;

four pins being connected to said drive circuitry;

two pins being connected to a power supply and a return; and two pins being used for setting an operating frequency of said drive circuitry.

16. The integrated circuit of claim 15, wherein said operating frequency of said drive circuitry is determined by a voltage-controlled oscillator (VCO), and a control voltage is supplied to said VCO by an input capacitor connected to one of said two pins for setting an operating frequency.

17. The integrated circuit claim of 16, wherein the other one of said two pins is used to set a minimum frequency of said VCO.

18. The integrated circuit of claim 16, wherein said ZVMCS circuitry sets said control voltage by controlling a charge on said input capacitor of said VCO.

19. A method for controlling a power supply circuit which delivers power to a load circuit that includes a fluorescent lamp, comprising the steps of:

providing drive signals to the power supply circuit, receiving sense signals indicating operating conditions of at least one of the power supply circuit and the load circuit, responding to the sense signals by modifying the drive signals; and adaptively maintaining zero-voltage-switching and minimum-current-switching (ZVMCS), by sensing an output of said power supply circuit and in response thereto, controlling said drive signals to maintain said power supply circuit under ZVMCS conditions;

wherein said load circuit has a resonant frequency;

said power supply circuit supplies power at an operating frequency; and said operating frequency is maintained at or near said resonant frequency.

20. The method of claim 19, wherein said operating frequency is maintained above but near said resonant frequency.

21. The method of claim 19, in which the power supply circuit includes a half-bridge circuit with low and high side power devices, the drive signals including low side drive signals to control the low side power device and high side drive signals to control the high side power device; wherein said ZVMCS conditions are maintained by sensing an output current of said half-bridge circuit between said high side and low side power devices at a switching time of one of said power devices, and controlling said drive signals so as to maintain said output current near or at zero at said switching time.

22. The method of claim 19, in which the power supply circuit includes a half-bridge circuit with low and high side power devices, the drive signals including low side drive signals to control the low side power device and high side drive signals to control the high side power device; wherein said ZVMCS conditions are maintained by sensing an output voltage of said half-bridge circuit between said high side and low side power devices at a switching time of one of said power devices, and controlling said drive signals so as to maintain said output voltage near or at zero at said switching time.

23. The method of claim 22, wherein said ZVMCS conditions are maintained by sensing an output current of said half-bridge circuit between said high side and low side power devices at a switching time of one of said power devices, and controlling said drive signals so as to maintain said output current near or at zero at said switching time.

24. The method of claim 19, wherein said operating frequency is determined by a voltage-controlled oscillator (VCO), and comprising the step of controlling a control voltage supplied to said VCO.

25. The method of claim 24, wherein said control voltage is supplied by an input capacitor of said VCO, and comprising the step of controlling a charge on said capacitor in order to set said operating frequency.

* * * * *